Figure 10:
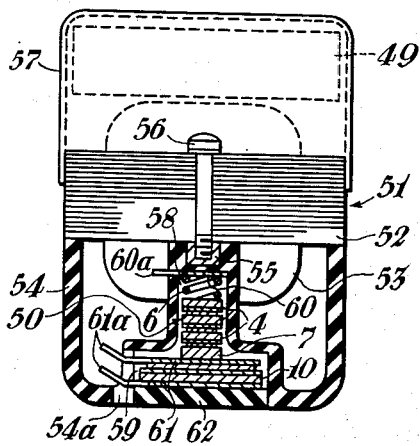

Nov. 13, 1951     L. K. HEDDING ET AL     2,574,783
RECTIFIER ASSEMBLY
Filed June 24, 1949                                2 SHEETS—SHEET 1
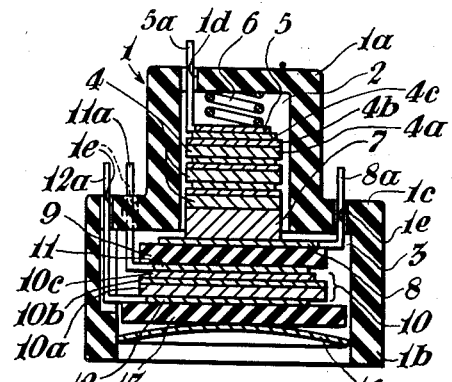
INVENTORS.
Linnie K. Hedding
and Regis H. Zetwo
BY
THEIR ATTORNEY Nov. 13, 1951  L. K. HEDDING ET AL  2,574,783
RECTIFIER ASSEMBLY
Filed June 24, 1949  2 SHEETS—SHEET 2

INVENTORS.
Linnie K. Hedding
and Regis H. Zetwo
BY
THEIR ATTORNEY

Patented Nov. 13, 1951

2,574,783

UNITED STATES PATENT OFFICE 2,574,783

RECTIFIER ASSEMBLY

Linnie K. Hedding, Wilkinsburg, and Regis H. Zetwo, Swissvale, Pa., assignors to Westinghouse Air Brake Company, a corporation of Pennsylvania Application June 24, 1949, Serial No. 101,014

18 Claims. (Cl. 321—8)

1

Our invention relates to electric rectifier assemblies of the stacked disc type, and particularly to an assembly of such rectifiers which is usable in a circuit where rectifiers of different current-carrying capacities are required.

Power supply systems for charging both the A and B batteries of a radio receiver have been proposed. Because of the different characteristics of the A and B batteries, the rectifier for the A battery is required to have relatively high current and low voltage characteristics, while the rectifier for the B battery is required to have relatively high voltage and low current characteristics. These battery charging circuits heretofore proposed may include a transformer and a condenser, for purposes described therein.

It is therefore an object of our present invention to provide an improved assembly of rectifier elements including portions of different current carrying capacities.

Another object is to provide improved means for spring loading a stack of rectifier elements so as to maintain all the elements under pressure, thereby reducing the contact resistance between the surfaces of the rectifiers.

Another object is to provide an improved terminal construction for such assemblies.

A further object is to provide such an assembly which is compact and easily assembled from its component parts.

Another object is to provide an improved unit including a rectifier stack assembly, a transformer, and a condenser.

We accomplish the foregoing and other objects of our invention by providing a molded plastic housing having aligned compartments of different cross-sectional areas. A long stack of small area elements is provided in the smaller of the two compartments and a shorter stack of wider area elements in the larger compartment. The two stacks are held in compression by the same spring loading arrangement, several modifications of which are shown. Several different terminal arrangements are shown, each involving the use of terminal discs which are stacked with the rectifier elements and project in various ways to the outside of the casing. In certain modifications of our invention, the terminal lugs are arranged so as to project through suitable apertures provided in the casing, through which the lugs are inserted during assembly.

Two modifications of combination units are shown, wherein a rectifier stack assembly of the type described is combined with a condenser and a transformer for use in a battery charging circuit.

2

We shall describe several forms of rectifier assemblies embodying our invention, and shall then point out the novel features thereof in claims.

Figure 11:
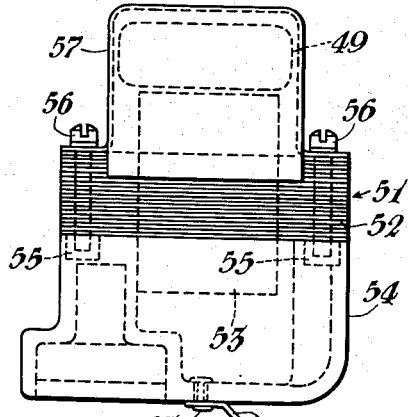
Figure 12:
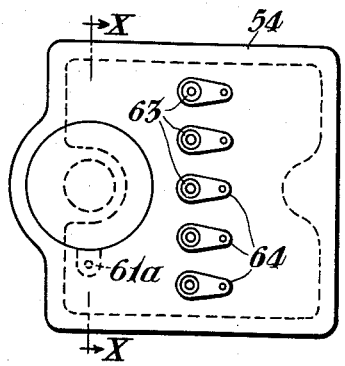
Figure 9:
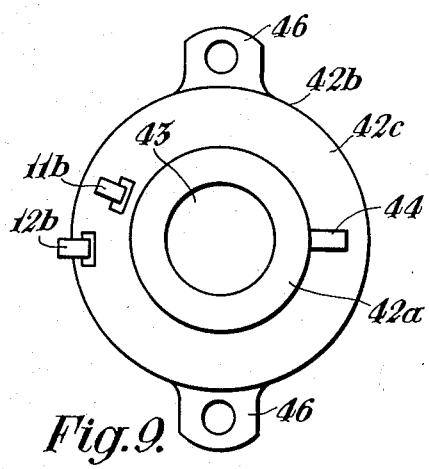
Figure 7:
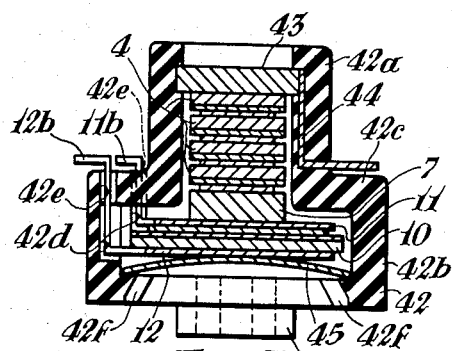
Figure 8:
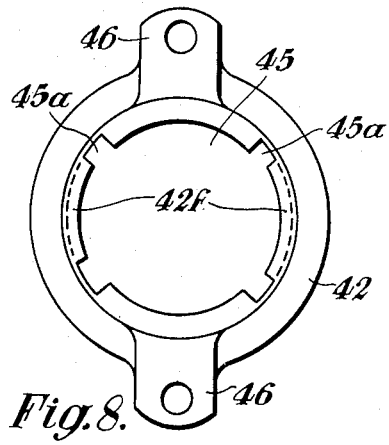

In the drawings, Fig. 1 is a cross-sectional view of one form of rectifier stack assembly embodying certain features of our invention. Fig. 2 is a cross-sectional view, taken on the line II—II of Fig. 4, looking in the direction of the arrows, of a combined rectifier, transformer, and condenser unit embodying certain features of our invention. Fig. 3 is another cross-sectional view of the unit shown in Fig. 2, taken along the lines III—III of Figs. 2 and 4, looking in the direction of the arrows. Fig. 4 is a bottom view of the combined unit shown in Figs. 2 and 3. Fig. 5 is a cross-sectional view of another form of rectifier stack assembly embodying our invention. Fig. 6 is a wiring diagram of a battery charging circuit with which our invention may be used. Fig. 7 is a cross-sectional view of a modified form of rectifier stack assembly embodying certain features of our invention. Fig. 8 is a bottom plan view of the assembly shown in Fig. 7. Fig. 9 is a top plan view of the assembly shown in Fig. 7. Fig. 10 is a cross-sectional view, taken along the line X—X of Fig. 12, of another form of combined rectifier, transformer, and condenser unit embodying our invention. Fig. 11 is an elevational view of the unit shown in Fig. 10, taken from the right-hand side of the unit as it appears in Fig. 10. Fig. 12 is a bottom plan view of the unit shown in Figs. 10 and 11.

Similar reference characters refer to similar parts in each of the several views.

Figure 1

There is shown at 1 a hollow, generally cylindrical casing of molded insulating material. The casing 1 has a relatively narrow portion 1a and a relatively wide portion 1b separated by a shoulder 1c. A compartment 2 is formed inside the narrow portion 1a of the casing 1. The compartment 2 is closed at its upper end and opens at its lower end into a larger compartment 3 formed inside the wide portion 1b of the casing.

Inside the compartment 2 is a stack of rectifier elements 4, which may be of the selenium, copper oxide, or other suitable type. As shown, these elements are of the selenium type, and each comprises a short metal base 4a, a selenium composition layer 4b and a counterelectrode layer 4c. The thickness of the layers 4b and 4c has been exaggerated in the drawing to make the structure clear. A terminal disc 5, of suitable electrically conducting material, rests on the uppermost one of the rectifier elements 4. The terminal disc 5 is provided with an upwardly projecting terminal lug 5a which extends through an opening 1d formed in the top of the casing 1. A coil spring 6 is held in compression between the top of the casing 1 and the terminal disc 5. The lowest rectifier element 4 rests on a spacer block 7, which lies partly in the compartment 2 and partly in the compartment 3. Under the block 7 is a terminal disc 8, having a terminal lug 8a which projects through a suitable aperture 1e in the casing 1. The terminal disc 8 rests on an insulating disc 9.

Below the disc 9 is a second rectifier stack comprising a single rectifier element 10 between terminal discs 11 and 12. The element 10, like the element 4, comprises a base 10a, a selenium composition layer 10b and a counterelectrode layer 10c. The terminal discs 11 and 12 are provided with lugs 11a and 12a corresponding to the lug 8a on disc 8. Lugs 11a and 12a also project through apertures 1e in the casing 1. The lower end of compartment 3 is closed by an insulating closure disc 13 held in place by a concave spring disc 14. The spring disc 14 is made so that its free diameter is somewhat greater than the internal diameter of the compartment 3. When the spring disc 14 is pushed into the compartment 3, it yields, its center bulging upwardly so that it contracts sufficiently to pass into the compartment 3. After being released, it again expands, and its edges bite into the casing 1 and prevent the withdrawal of the spring disc 14 or the other parts of the assembly from the casing 1.

The arrangement shown in Fig. 1 may be constructed by inserting the component parts in the proper order through the bottom of the casing 1. After assembly, all the rectifier elements, terminal discs, and the spacer block are held in compression between the coil spring 6 and the disc spring 14. This maintains the several rectifier elements and terminal discs in good electrical contact with each other. The apertures 1d and 1e may then be sealed with a suitable sealing material.

It should be noted that the dimensions of the rectifier elements 4, spacer block 7, spring 6, and the compartment 2 are such that the spacer block 7 lies partly in the compartment 2 and partly in compartment 3. The block 7 is then effective to keep the edge portion of the terminal disc 8 from resting against the internal surface of the shoulder 1c. If the edge of the terminal disc 8 were permitted to rest against the shoulder 1c, then the spring pressure available to hold the rectifier parts in contact would be different, and hence might lead to erratic operation of the rectifiers.

Since the rectifier elements 4 are of relatively small area, their current-carrying capacity is low. However, since several of these rectifier elements are stacked on top of one another, the voltage characteristic of the complete stack is comparatively high. The element 10 is made wider, so that its current-carrying capacity is much greater than that of the stack 4. Furthermore, only one rectifier element 10 is provided, so that the voltage drop between the terminals of the lower stack is relatively low. It will be recognized that the assembly shown is readily adaptable to other current and voltage requirements by changing the number of rectifier elements in either of the stacks or by changing the size of the elements used.

Figures 2 to 4

There is shown in these figures a combined unit including a rectifier stack assembly generally indicated at 15, a transformer 16, and a condenser 17. The combined unit is supported on a molded insulating base 18, of a box-like formation, open at the top, and provided at its opposite sides with mounting lugs 18a. A pair of brackets 19 are attached to the opposite walls of the base 18 nearest their upper edges. Transformer 16 has a winding 16a and a core 16b which is supported on the brackets 19.

The base 18 is provided with two aligned compartments 20 and 21 for receiving the rectifier stack assembly 15. The compartments 20 and 21 correspond generally to the compartments 2 and 3 of Fig. 1.

The rectifier stack assembly 15 is mounted on its side, with the rectifier elements standing on edge. The stack assembly 15, as best seen in Fig. 2, comprises a low current high voltage stack of elements 4 having a terminal disc 22 at the closed end of the compartment 20 and a terminal disc 23 near the opposite end of the compartment 20. The rectifier assembly 15 also includes a high current, low voltage stack which comprises a single rectifier element 10, a terminal disc 24 to the left of the rectifier element, and a terminal disc 25 to the right of the element. A coil spring 27 is held in compression between the terminal discs 23 and 24, and serves to hold the elements of both stacks in contact under pressure. An insulating disc 28 is provided between terminal disc 23 and spring 27.

The compartments 20 and 21 are open at the top, as they appear in the drawings, or at the sides, considering them with respect to the axis of the cylindrical stack. The rectifier elements, terminal discs, and spring 27 may be assembled in the compartments 20 and 21 by insertion through the open top of these compartments. The terminal discs 22 and 24 are provided with downwardly projecting terminal lugs 22a and 24a which extend through suitable openings in the base 18 downwardly to a point where they are accessible from the exterior of the unit.

A coverplate 29 is provided for the compartments 20 and 21. The terminal discs 23 and 25 are provided with upwardly projecting terminal lugs 23a and 25a which pass through suitable terminal lugs apertured in the coverplate 29, so that the plate 29 may be slipped on over the lugs 23a and 25a after the rectifier stack has been assembled in the compartments 20 and 21. The coverplate 29 is held in place on the base 18 by means of a screw 30, which also holds a finger 31 for retaining the condenser 17 in place within the box-like base 18.

Additional openings are provided in the bottom of the base 18 for receiving bushings 32 which carry wires from the interior of the enclosure formed by base 18 and its cover 33.

Figure 5

There is shown in Fig. 5 a rectifier stack assembly having somewhat different terminal arrangements. In particular, the terminal arrangements provided for the high current rectifier stack are so constructed as to give that stack an exceptionally high current-carrying capacity.

The rectifier stack assembly of Fig. 5 is enclosed in a casing 34, which is generally similar to the casing of Fig. 1, except for certain details which will be specifically mentioned below. The casing 34 encloses a stack of rectifier elements 4, a spacer block 7, a closure block 13, and a spring disc 14, all of which correspond generally to the similarly numbered elements of Fig. 1.

Above the uppermost element 4 is provided a terminal disc 35 having an upstruck lug 35a projecting upward near its center through a suitable terminal lug aperture provided in the end of casing 34. This aperture may of course be sealed by suitable sealing material after the stacks are assembled.

The high current-carrying capacity stack shown in Fig. 5 between the spacer block 7 and the closure block 13 comprises three rectifier elements 10 separated from each other and from the blocks 7 and 13 by terminal discs 36. Each of the discs 36 is provided with a terminal lug 36a or 36b. The lugs 36a and 36b are arranged during assembly so that alternate lugs project from opposite sides of the stack. All the lugs projecting from one side of the stack are electrically connected. As shown in the drawings, the lugs may be bent over to engage each other and are soldered at their point of contact. The arrangement is such that all the rectifier elements 10 are electrically in parallel between the connected terminals 36a at the left of the drawings and the connected terminals 36b at the right of the drawings. It may therefore be seen that the current-carrying capacity of this stack assembly is that of the three elements 10 in parallel. While in the modification shown, three elements are connected in parallel, it will be readily understood that by using the same principles of construction three or more stacks of elements could be connected in parallel. Fig. 5 may be considered as showing three stacks in parallel, each stack consisting of one element.

The casing 34 is provided with slots 34a at its opposite sides to permit assembly of the terminal discs 36 and their projecting lugs. After assembly, these slots 34a may be sealed with suitable sealing material.

In the assembly shown in Fig. 5, the compression spring such as that shown at 6 in Fig. 1, is omitted, and the spring disc 14 alone holds the elements of the rectifier stacks in electrical contact.

It may be seen that the two rectifier stacks of Fig. 5 have only three terminals, 35a, 36a, and 36b. The terminal 36a is common to both the upper stack and the lower stack. Such an arrangement may be used in connection with a battery charging circuit such as that shown in Fig. 6. In that figure, alternating current from the secondary of a transformer 37 flows through a rectifier 38, which corresponds to the lower stack in Fig. 5, to charge an "A" battery 39. Current also flows from the same secondary winding through a rectifier 40, which corresponds to the upper stack in Fig. 5, to charge a "B" battery 41. The terminals 35a, 36a, and 36b are shown diagrammatically in Fig. 6.

Since the lug 35a projects through a central aperture in the casing, the angular position of disc 35 during assembly is not critical. Hence assembly is easier than is the case when the lug must be aligned with an aperture spaced from the center, as in the case of lug 5a and aperture 1d of Fig. 1, for example.

*Figures 7 to 9*

These figures illustrate another form of rectifier stack assembly corresponding generally to the rectifier stack assembly of Fig. 1. This assembly includes a casing 42 of generally cylindrical form, having a narrow portion 42a and a wide portion 42b separated by a shoulder 42c. The casing 42 is hollow and its upper end is closed by a heavy terminal disc 43 molded in the casing a short distance below its upper end. A terminal lug 44 is attached to the disc 43, as by brazing, before the molding operation, so that lug 44 is also molded in the casing 42. The end of terminal lug 44 projects outwardly of the casing 42 in a generally radial direction just above the shoulder 42c.

The rectifier elements 4, the spacer block 7, the rectifier element 10, and the terminal discs 11 and 12 correspond generally to the similarly numbered elements in Fig. 1. The only substantial difference is that the terminal lugs 11b and 12b on the discs 11 and 12 have their ends bent over after assembly so that they extend parallel to the surface of the shoulder 42c. It will be remembered that the corresponding terminal lugs 11a and 12a of Fig. 1 extended parallel to the axis of the casing 1. The casing 42 is provided with recesses 42d leading into apertures 42e to receive the terminal lugs 11b and 12b during assembly of the rectifier stacks.

A concave spring disc 45 closes the lower end of the casing 42 and also holds the two rectifier stacks in compression. The spring disc 45 is provided with a pair of diametrically opposite wings 45a, and the casing 42 is provided with a pair of diametrically opposite projections 42f. These parts are best shown in Fig. 8. When the stacks are assembled, the disc 45 is pushed through the opening at the lower end of casing 42 with the wings 45a at right angles to the position shown in Fig. 8. After the wings 45a have been pushed past the projections 42f, the disc 45 is rotated through 90 degrees to bring the wings 45a back behind the projections 42f, which thereby maintain the disc 45 in place.

The lower end of casing 42 is provided with a pair of diametrically opposite legs 46 which serve to support the casing. The legs 46 extend downwardly beyond the lower surface of the other parts of casing 42, so that the casing 42 is supported slightly above whatever surface the legs 46 may be attached to. This permits a circulation of air past the spring disc 45 and serves to cool the rectifier assembly in case it heats up due to the current flow therethrough. The terminal disc 43 at the upper end of the assembly also serves to dissipate heat from the rectifier stacks. It should be noted that by virtue of the construction of the upper end of casing 42, the terminal disc 43 is recessed below the outer surface of the casing and is thereby protected against accidental electrical contact. The spring disc 45, which is in electrical contact with terminal disc 12 to provide better heat conduction, is similarly recessed in the casing to protect it from accidental electrical contact.

*Figures 10 to 12*

These figures show a different form of combined unit similar to that of Figs. 2 to 4, and including a transformer 51, a condenser 49, and a rectifier stack assembly 50. Transformer 51 is provided with a core 52 and a winding 53.

The three principal elements in the combined unit are supported on a box-like base 54, of molded insulating material. Threaded metallic inserts 55 are molded into the upper surfaces of the sides of base 54 at opposite points. The transformer core 52 has its ends resting on these upper surfaces of the base 54. The core 52 is held on the base 54 by means of bolts 56, whose lower ends are received in the threaded inserts 55. The bolts 56 also hold a cover 57 in place on the transformer. The condenser 49 rests on the transformer winding 53 and is enclosed by the cover 57.

The molded base 54 is made hollow at one end to form two vertically aligned cylindrical compartments 58 and 59, which correspond generally to the compartments 2 and 3 of Fig. 1, and which house the rectifier assembly 50. The compartment 58 encloses a stack of rectifier elements 4 of relatively low current-carrying capacity, and the compartment 59 houses a stack comprising a single element 10 of relatively high current-carrying capacity. At the upper end of the compartment 58, a terminal disc 60 is molded into the base 54. The terminal disc 60 is provided with a terminal lug 60a which projects through the walls of compartment 58 into the space within the base 54. A compression spring 6 is retained between the terminal disc 60 and the uppermost rectifier element 4.

A pair of terminal discs 61 is located above and below the rectifier element 10. The discs 61 are provided with projecting terminal lugs 61a which extend through a suitable opening 54a in the wall of compartment 59 into the space within the base 54. The terminal discs 61 are inserted into the compartment 59 through its open bottom during assembly of the rectifier stack. A spacer block 7 is located between the lowest element 4 and the upper surface of the upper terminal disc 61. The lower side of the compartment 59, which is left open during manufacture of the base 54 so that the rectifier stacks may be assembled through it, is closed after the stacks are assembled by closure plate 62, also of insulating material, which may be sealed in place by any well-known means. After the rectifier stacks are assembled, the opening 54a may also be sealed with any suitable sealing material.

The bottom of the base 54 is provided with a number of metal rivets 63 onto which are soldered wires from inside the base for making electrical connections to outer terminals 64.

Although we have herein shown and described only a few forms of rectifier assemblies embodying our invention, it is understood that various changes and modifications may be made therein within the scope of the appended claims without departing from the spirit and scope of our invention.

Having thus described our invention, what we claim is:

1. A rectifier assembly having a low current portion and a high current portion comprising a casing having aligned openings of different cross-sectional areas, a low current rectifier stack including at least one rectifier element in the opening of smaller area, a high current rectifier stack including at least one rectifier element in the opening of larger area, and means holding the elements of both stacks in longitudinal compression.

2. A rectifier assembly having a low current portion and a high current portion comprising a casing having aligned openings of different cross-sectional areas, a stack of rectifier elements of low current-carrying capacity in the opening of smaller area, a stack of rectifier elements of high current- carrying capacity received in the opening of larger area, and a spring in the casing holding the flat faces of the elements of both stacks in contact.

3. A rectifier assembly having a low current portion and a high current portion, comprising a casing having a first compartment therein closed at one end and opening at the other end into a second compartment of larger cross-sectional area which is closed at its opposite end, a compression spring at the closed end of one of said compartments, a low current rectifier stack including at least one rectifier element in said first compartment, a high current rectifier stack including at least one rectifier element in the second compartment, and a spacer block in said first compartment at the end thereof adjacent to the second compartment, the relative lengths of the spring, stacks and block being such that the block projects only partly into the second compartment, said spring being effective to hold the elements of both stacks in compression.

4. A rectifier assembly having a low current portion and a high current portion, comprising a casing having a first compartment therein closed at one end and opening at the other end into a second compartment of larger cross-sectional area which is closed at its opposite end, a low current rectifier stack including at least one rectifier element in said first compartment, a spacer block in said first compartment at the end thereof adjacent to the second compartment, the combined length of the stack and block being such that the block projects only partly into the second compartment, and a high current rectifier stack including at least one rectifier element in the second compartment, and a compression spring at the closed end of said second compartment, said spring being effective to hold the elements of both stacks in compression.

5. A rectifier assembly having a low current portion and a high current portion, comprising a casing having a first compartment therein closed at one end and opening at the other end into a second compartment of larger cross-sectional area which is closed at its opposite end, a compression spring in the closed end of the first compartment, a low current rectifier stack including at least one rectifier element in said first compartment, a spacer block in said first compartment at the end thereof adjacent to the second compartment, the combined length of the spring, stack and block being such that the block projects only partly into the second compartment, and a high current rectifier stack including at least one rectifier element in the second compartment between the block and the closed end of said second compartment, said spring being effective to hold the elements of both stacks in compression.

6. A rectifier assembly having a low current portion and a high current portion comprising a casing having a first compartment therein closed at one end and opening at the other end into a second compartment of larger cross-sectional area, a low current rectifier stack including at least one rectifier element in said first compartment, a high current rectifier stack including at least one rectifier element in said second compartment, said casing having an opening to give access to said compartments for assembly of said stacks therein, a closure for said opening, and means holding the elements of both stacks in longitudinal compression.

7. A rectifier assembly having a low current portion and a high current portion comprising a casing having a first compartment therein closed at one end and opening at the other end into a second compartment of larger cross-sectional area, a low current rectifier stack including at least one rectifier element in said first compartment, a high current rectifier stack including at least one rectifier element in said second compartment, said casing having an opening at one side of said compartments to give access to said compartments for assembly of said stacks therein, means holding the elements of both stacks in longitudinal compression, and a closure element blocking said opening.

8. A rectifier assembly having a low current portion and a high current portion comprising a casing having a first compartment therein closed at one end and opening at the other end into a second compartment of larger cross-sectional area, a low current rectifier stack including at least one rectifier element in said first compartment, a high current rectifier stack including at least one rectifier element in said second compartment, said casing having an opening at the end of said second compartment opposite said first compartment to give access to said compartments for assembly of said stacks therein, and means holding the elements of both stacks in longitudinal compression, comprising a yieldable closure element larger than said opening and wedgable therein to close the opening.

9. A rectifier assembly having a low current portion and a high current portion comprising a casing having a first compartment therein closed at one end and opening at the other end into a second compartment of larger cross-sectional area, a low current rectifier stack including at least one rectifier element in said first compartment, a high current rectifier stack including at least one rectifier element in said second compartment, said casing having an aperture at the end of said second compartment opposite said first compartment to give access to said compartments for assembly of said stacks therein, and a closure element for closing said aperture, said housing and said closure element having projecting lugs adapted to interlock upon insertion of the closure element into the aperture and rotation of the element in the aperture, said closure element being effective when said lugs are so interlocked to close the aperture.

10. A rectifier assembly having a low current portion and a high current portion comprising a casing having a first compartment therein closed at one end and opening at the other end into a second compartment of larger cross-sectional area, a low current rectifier stack including at least one rectifier element in said first compartment, a high current rectifier stack including at least one rectifier element in said second compartment, a spring in the casing holding the flat faces of the elements of both stacks in electrical contact, said casing having an aperture at the end of said second compartment opposite said first compartment to give access to said compartments for assembly of said stacks therein, and a yieldable closure element larger than said aperture and wedgable therein to close the aperture, said closure element being effective when in place to aid said spring in holding the elements of both rectifier stacks in compression.

11. A rectifier assembly having portions of different current-carrying capacities, comprising a casing having a first compartment therein closed at one end and opening at the other end into a second compartment of larger cross-sectional area which is closed at its opposite end, a low current rectifier stack including at least one rectifier element in said first compartment, a high current rectifier stack including at least one rectifier element in the second compartment, a first terminal disc at the closed end of the first compartment, a second terminal disc at the closed end of the second compartment, and a third terminal disc at the inner end of the second stack, a terminal lug on each of said terminal discs, said lugs projecting through the casing to the outside thereof, and means holding the rectifier stacks and the terminal discs in contact.

12. A rectifier assembly having portions of different current-carrying capacities, comprising a casing having a first compartment therein closed at one end and opening at the other end into a second compartment of larger cross-sectional area, a low current rectifier stack including at least one rectifier element in said first compartment, a high current rectifier stack including at least one rectifier element in the second compartment, a first terminal disc at the closed end of the first compartment, second and third terminal discs at the opposite ends of the high current rectifier stack, a terminal lug on each of said terminal discs, said lugs being adapted to project outside said casing, said casing having an opening at the end of said second compartment opposite said first compartment to give access to said compartments for assembly of the stacks and terminal discs therein, a closure for said opening, the lugs on said second and said third discs extending at right angles to the discs, said casing having two circumferentially spaced terminal lug apertures in the end of said second compartment nearest said first compartment and adapted to receive the lugs on said second and third discs as the discs are assembled so that said lugs project through said lug apertures, and means holding the rectifier elements and the terminal discs in electrical contact.

13. A rectifier assembly having portions of different current-carrying capacities, comprising a casing having a first compartment therein closed at one end and opening at the other end into a second compartment of larger cross-sectional area, a low current rectifier stack including at least one rectifier element in said first compartment, a high current rectifier stack including at least one rectifier element in the second compartment, a first terminal disc at the closed end of the first compartment, a second and a third terminal disc at the opposite ends of the high current rectifier stack, a terminal lug on each of said terminal discs, said lugs being adapted to project outside said casing, said casing having an opening at the end of said second compartment opposite said first compartment to give access to said compartments for assembly of the stacks and terminal discs therein, a closure for said opening, the lug on said first disc being struck up at right angles to the disc near its center, said casing having a terminal lug aperture adapted to receive said one lug as said disc is assembled so that said one lug projects through said lug aperture, and means holding the rectifier elements and the terminal discs in electrical contact.

14. A rectifier assembly having portions of different current-carrying capacities, comprising a casing having a first compartment therein closed at one end and opening at the other end into a second compartment of larger cross-sectional area, a low current rectifier stack including at least one rectifier element in said first compartment, a high current rectifier stack including at least one rectifier element in the second compartment, a first terminal disc at the closed end of the first compartment, a second terminal disc at the closed end of the second compartment, and a third terminal disc at the inner end of the second stack, a terminal lug on each of said terminal discs, said lugs being adapted to project outside said casing when said discs are assembled, a spring in the casing holding the elements of both stacks and the terminal discs in electrical contact, said casing having an aperture to give access to said compartments for assembly of the stacks therein, and a closure element for closing said aperture.

15. A rectifier assembly having portions of different current-carrying capacities, comprising a casing having a first compartment therein closed at one end and opening at the other end into a second compartment of larger cross-sectional area, a low current rectifier stack including at least one rectifier element in said first compartment, a high current rectifier stack including at least one rectifier element in the second compartment, a first and a second terminal disc at the opposite ends of the low current rectifier stack, third and fourth terminal discs at the oposite ends of the high current rectifier stack, a terminal lug on each of said terminal discs, an insulation member between said stacks, said casing having an opening at the end of the second compartment opposite said first compartment to give access to said compartments for assembly of the stacks and terminal discs therein, a closure for said opening, each one of said lugs extending at right angles to its supporting disc, said casing having a terminal lug aperture to receive each one of said lugs as the respective disc is assembled so that the lug projects through said lug aperture, and means holding the rectifier elements and the terminal discs in electrical contact.

16. A rectifier assembly having portions of different current-carrying capacities, comprising a casing having a first compartment therein closed at one end and opening at the other end into a second compartment of larger cross-sectional area, a low current rectifier stack including at least one rectifier element in said first compartment, a high current rectifier stack including at least one rectifier element in the second compartment, a first and a second terminal disc at the opposite ends of the low current rectifier stack, a third and a fourth terminal disc at the opposite ends of the high current rectifier stack, a terminal lug on each of said terminal discs, an insulating member between said stacks, said casing having an opening at one side of said compartments to give access to said compartments for assembly of the stacks and terminal discs therein, a closure for said opening, each said lug comprising a flat lateral extension of its associated disc, said casing having terminal lug apertures therein to receive certain of the lugs as the discs are assembled, said closure having terminal lug apertures to receive others of the lugs as the closure is put in place, and means holding the rectifier elements and the terminal discs in electrical contact.

17. A rectifier assembly having portions of different current-carrying capacities, comprising a molded casing of insulating material having a first compartment formed therein, a metal disc molded in said casing and closing one end of said compartment, said disc having its outer surface exposed so as to radiate heat and recessed in said casing so as to be protected against electrical contact, said first compartment opening at the other end into a second compartment of larger cross-sectional area which is closed at its oposite end, a low current rectifier stack including at least one rectifier element in said first compartment, a high current rectifier stack including at least one rectifier element in the second compartment, said casing having an opening at the end of said second compartment opposite said first compartment to give access to said compartments for assembly of said stacks therein, means holding said rectifier elements in electrical contact with each other and with said metal disc, comprising a metallic closure element blocking said opening, and a pair of supporting legs formed on said casing on opposite sides of said opening and extending below said opening so as to permit circulation of air past said metallic closure.

18. An electric rectifier assembly including a box-like base of insulating material open at the top and formed with two aligned compartments of different cross-sectional areas, a transformer having a core and a winding on the core, means for attaching the core to the sides of said base so that said transformer bridges the base, a rectifier stack assembly of relatively low current-carrying capacity in the smaller of said two compartments, a rectifier stack assembly of relatively high current-carrying capacity in the larger of the two compartments, a cover for the base forming therewith an enclosure for said transformer, and a condenser in said enclosure.

LINNIE K. HEDDING.
REGIS H. ZETWO.

REFERENCES CITED

The following references are of record in the file of this patent:

UNITED STATES PATENTS

| Number | Name | Date |
| --- | --- | --- |
| 1,947,240 | Amsden | Feb. 13, 1934 |
| 2,451,726 | Fry | Oct. 19, 1948 |
| 2,491,031 | Burgess | Dec. 13, 1949 |